United States Patent
Otterness et al.

(10) Patent No.: US 6,601,138 B2
(45) Date of Patent: Jul. 29, 2003

(54) APPARATUS SYSTEM AND METHOD FOR N-WAY RAID CONTROLLER HAVING IMPROVED PERFORMANCE AND FAULT TOLERANCE

(75) Inventors: Noel S. Otterness, Boulder, CO (US); Joseph G. Skazinski, Bertoud, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/326,497

(22) Filed: Jun. 4, 1999

(65) Prior Publication Data

US 2001/0049774 A1 Dec. 6, 2001

Related U.S. Application Data

(60) Provisional application No. 60/088,200, filed on Jun. 5, 1998.

(51) Int. Cl.[7] ............................................... G06F 12/00
(52) U.S. Cl. ........................ 711/114; 711/148; 709/104; 709/105
(58) Field of Search ................................ 711/114, 147, 711/148; 709/105, 104

(56) References Cited

U.S. PATENT DOCUMENTS

| | | | | |
|---|---|---|---|---|
| 4,633,387 A | * | 12/1986 | Hartung et al. | 709/105 |
| 5,459,864 A | | 10/1995 | Brent et al. | 709/105 |
| 5,768,623 A | | 6/1998 | Judd et al. | 710/37 |
| 5,892,945 A | * | 4/1999 | Mirchandaney et al. | 709/104 |
| 5,937,428 A | * | 8/1999 | Jantz | 711/114 |

FOREIGN PATENT DOCUMENTS

| | | |
|---|---|---|
| EP | 0 676 699 A2 | 3/1995 |
| EP | 0 760 503 A1 | 6/1996 |
| EP | 0 747 822 A2 | 12/1996 |
| WO | WO 98/28686 | 7/1998 |

OTHER PUBLICATIONS

Clark, et al., "An SCI Interconnect Chipset and Adapter" (Symposium Record, Hot Interconnects IV, pp. 221–235, Aug. 1996).

Gibson, et al. "RAIDframe: Rapid prototyping for disk arrays" (Oct. 18, 1995, CMB–CS–95–200).

Wolf–Dietrich, et al., "The Mercury Interconnect Architecture: A cost–effective infrastructure for high–performance servers" (24th Annual Int'l Symposium on Computer Architecture, pp. 98–107).

Oct. 29, 1999, PCT International Search Report; US99/12553.

* cited by examiner

Primary Examiner—Reginald G. Bragdon
(74) Attorney, Agent, or Firm—Dorsey & Whitney LLP

(57) ABSTRACT

This invention describes structure and method for an efficient architecture allowing n-controllers to work together to improve system performance and fault tolerance, when n is greater than two. This invention provides a new type of RAID architecture using operational primitives in a message passing multi-controller environment to solve the problems presented in having multiple controllers distribute a non-uniform workload. This architecture allows for expansion of the I/O processing capability limited only by the efficiency of the underlying message transport method. In simple terms, the inventive technique breaks input/output (I/O) operations into a set of simple methods which can then be passed around as tokens, or pieces of work to be executed by whichever controller has the least amount of work to perform. (I/O operations include all operations needed to perform the tasks of a RAID controller. These include host read/write commands, rebuilds, data migration, etc.) The workload distribution adapts to the available and types of processing resources available in the system. The advantage of this type of architecture is that additional processing resources can be added to the system to address specific areas which need higher throughput without the need to rethink the software architecture.

47 Claims, 7 Drawing Sheets

APPARATUS SYSTEM AND METHOD FOR N-WAY RAID CONTROLLER HAVING IMPROVED PERFORMANCE AND FAULT TOLERANCE

This application claims priority from Provisional U.S. Patent Application Ser. No, 60/088,200, filed Jun. 5, 1998.

FIELD OF THE INVENTION

This invention pertains generally to a computer structure and method that provides a plurality of controllers using operational primitives in a message passing multi-controller non-uniform workload environment, and more particularly to a RAID computer architecture employing this structure and method.

BACKGROUND OF THE INVENTION

Modem computers require a large, fault-tolerant data storage system. One approach to meeting this need is to provide a redundant array of independent disks or RAID operated by a disk array controller. A conventional disk array controller consists of several individual disk controllers combined with a rack of drives to provide a fault-tolerant data storage system that is directly attached to a host computer. The host computer is then connected to a network of client computers to provide a large, fault-tolerant pool of storage accessible to all network clients. Typically, the disk array controller provides the brains of the data storage system, servicing all host requests, storing data to multiple (RAID) drives, caching data for fast access, and handling drive failures without interrupting host requests.

Traditionally, the storage pool is increased by adding additional independent racks of disk drives and disk array controllers, all of which require new communications channels to the host computer. One problem with this conventional configuration is that adding additional racks of disk drives to the network configuration typically requires a lot of intervention on the part of the system administrator. Also, because the disk array controllers are independent there is no provision for automatically distributing a workload across any of the available controllers, the burden of determining how to best attach and utilize the I/O processing resources falls upon the person responsible for setting up the system. Moreover, if the utilization of the I/O processors changes for any reason the system utilization may no longer be optimal.

An additional drawback of this conventional architecture, is that while adding more subsystems also adds more storage capacity to the system, it does not necessarily add additional processing capabilities. This is generally the case, because all controllers work independently with no cooperation amongst each other.

Some recent attempts to produce high-performance RAID systems having improved system utilization have used a single high-performance, monolithic controller. Because there is one controller, there is no possibility of an unbalanced workload between multiple independent controllers. Although the system utilization is improved, the cost of building the high-performance, monolithic controller dramatically increases the cost of the RAID system, which in the competitive computer memory market is highly undesirable. Another, more fundamental problem with this approach, as with all single controller systems, is that the failure of a single element, i.e., the controller, to renders the entire RAID system inoperable.

Dual active controllers were implemented to circumvent this problem of a single point of failure that all single controller RAID systems exhibit. Dual active controllers are connected to each other through a special communications channel as a means of detecting if the alternate controller malfunctions. The controller redundancy is provided by allowing a single controller in a system to fail and then having its workload picked up by the surviving controller. In order for one controller to take over the tasks which were being performed by the failed controller it must have information on what work was in progress on the controller which failed. To keep track of the work the partner controller is working on, messages are passed between the two controllers to mirror host writes and send configuration information back and forth. To fulfill these two requirements, two classes of controller to controller messages are required, data and configuration messages. The data messages can be considered to be static in that the information contained within the message is not generally processed until the partner controller fails. The configuration messages can be considered to be dynamic in that they are processed by the receiving controller immediately upon receipt and causes a change in the receiving controller's state. Although, dual active controllers eliminate the problems caused by failure of a controller in earlier systems with multiple independent controllers or a single monolithic controller, they still suffer from one of the same drawbacks. Namely, that there is no provision which would allow the controllers to distribute the workload across the controllers, and therefore the system utilization is not optimal.

Therefore, there remains a need to overcome the above limitations in the existing art which is satisfied by the inventive structure and method described hereinafter. In particular, there is a need for a memory system comprising a plurality of disk array controllers in which a failure of one or more of the controllers does not render the system inoperative or any of the data stored in the system inaccessible. There is also a need for a memory system to which additional controllers or memory arrays can be added to increase processing capabilities. There is a further need for memory system having an architecture which does not require extensive alterations either to the software or the hardware to expand the system.

SUMMARY OF THE INVENTION

Heretofore, RAID system performance and fault tolerance have been limited by the use of one or two independent controllers. This invention provides structure and method for an efficient architecture allowing n-controllers to work together to improve computer and disk system performance and fault tolerance, when n is greater than two.

The invention provides a new type of RAID architecture using operational primitives in a message passing multi-controller environment to solve the problems presented in having multiple controllers distribute a non-uniform workload. In simple terms, the inventive technique breaks input/output (I/O) operations into a set of simple methods which can then be passed around as tokens, or pieces of work to be executed by whichever controller has the least amount of work to perform. The advantage of this type of architecture is that additional processing resources can be added to the system to address specific areas which need higher throughput without the need to rethink the software architecture.

The present invention is directed to a memory system for controlling a data storage system, the memory system comprising a plurality of memory controllers coupled by a communications path. The memory controllers are adapted to dynamically distribute tokens to be executed amongst the memory controllers via the communications path. The communication path is a high speed channel connected directly between the memory controllers, and can comprise one or more of a fibre channel, a small computer system interface, a mercury interconnect. Preferably, each of the memory controllers comprises a shared-memory controller and the communications path is coupled to the memory controller through the shared-memory controller. More preferably, the shared-memory controller comprises a computer readable medium with a computer program stored therein for dynamically distributing tokens amongst the memory controllers. The memory system of the present is particularly suited for use in a networked computer system comprising a server computer coupled to a plurality of client computers, and in which the data storage system comprises a plurality of disk drives in a RAID configuration.

In another aspect, the invention is directed to a computer program product for dynamically distributing tokens amongst a plurality of memory controllers. The memory controllers are adapted to control a data storage system, and to transfer data between the data storage system and at least one host computer in response to an instruction from the host computer. The computer program comprises (i) a dispatch unit for receiving at least one token which is ready to be executed from a host computer and storing the token in a token ready queue, (ii) an execution unit for taking a token from the token ready queue which the memory controller is qualified to perform, instructing the associated memory controller to perform the token, and transmitting a completion signal to other memory controllers, and (iii) an inter-processor message control unit for transmitting tokens, data, and completion signals between memory controllers. Preferably, each of the memory controllers comprise a computer readable medium with the computer program stored therein. In one embodiment, the computer program further comprises a token generation unit for parsing an instruction from the host computers into component procedures which are communicated as tokens. In yet another embodiment, at least one of the host computers comprise a computer readable medium having an instruction program stored therein, and the instruction program comprises a token generation unit for parsing an instruction from the host computer into component procedures which are communicated as tokens.

In yet another aspect, the present invention is directed to a method for operating a memory system comprising a plurality of memory controllers, the memory system adapted to transfer data between a data storage system and one or more host computers in response to instructions therefrom. In the method, the plurality of memory controllers are coupled with a communications path. An instruction from a host computer is parsed to identify at least one instruction component procedure. A token representing each instruction component procedure is broadcast to the memory controllers and stored in a token ready queue in each of the memory controllers. Preferably, the method comprises the further step of dynamically distributing the tokens amongst the memory controllers via the communications path to balance a workload on each of the memory controllers.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF EMBODIMENTS OF THE INVENTION

Figure 1:
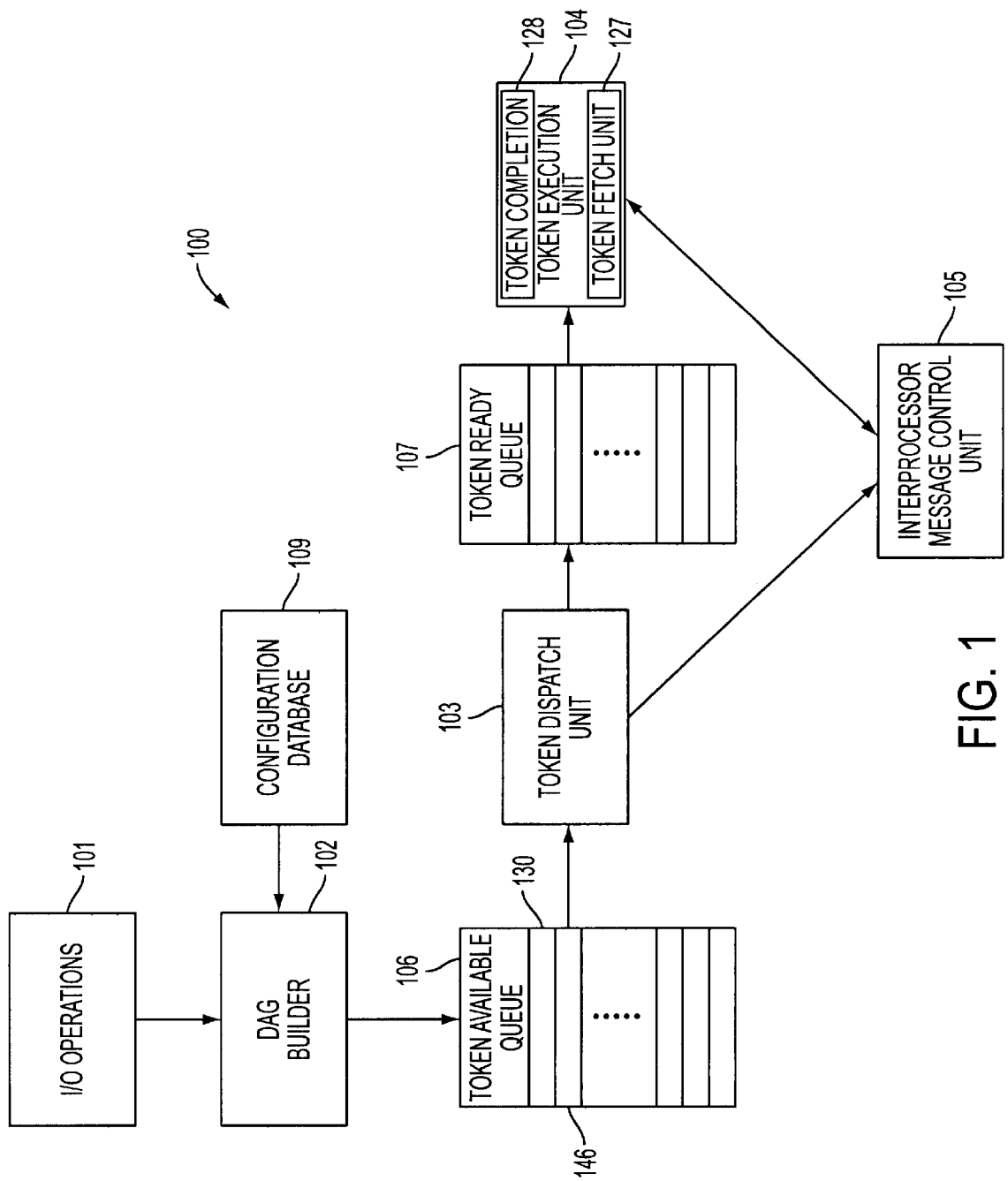
FIG. 1 shows a diagrammatic illustration of an embodiment of a Software Block Level Architecture.

The invention will now be described in detail by way of illustrations and examples for purposes of clarity of understanding. It will be readily apparent to those of ordinary skill in the art in light of the teachings of this invention that certain changes and modifications may be made thereto without departing from the spirit or scope of the appended claims. We first provide a top level architectural description. Section headings are provided for convenience and are not to be construed in limiting the disclosure, as all various aspects of the invention are described in the several sections whether specifically labeled as such in a heading.

The RAID system of the present invention comprises an N-Way Controller which provides a dynamic and cooperative architecture. One that scales from one to any number of controllers, providing additional storage, additional fault tolerance, and additional processing capabilities. The N-Way Controller solution provides an advance architecture where all controllers work together to service all data requests from a host computer.

The N-Way Controller architecture is modeled on a loosely coupled processor architecture theme. The idea is to be able to break a piece of work into smaller pieces which are independent of each other. Each of the smaller pieces can then be distributed to any of the available processing resources in the system. For example, I/O instructions from a host computer are parsed or divided into tasks or tokens representing instruction component procedures to be executed by one or more of a plurality of memory controllers. Certain multi-processor message primitives are required to insure the proper order of execution and to protect critical data paths. This new N-Way Controller architecture provides the structure, methods, and capability to intelligently and cooperatively distribute the pieces of work dynamically to any of the available I/O processing elements in the system.

This new architecture also couples numerous lower cost memory controllers together to achieve a new performance level. This architecture and structural topology provides higher performance, and greater reliability at a lower costs then the currently employed single or dual high end controllers.

The N-Way Controller architecture provides a new data distribution layer. As the original RAID architecture achieved higher performance and lower cost by distributing data amongst many low cost disk drives, this new architecture achieves higher performance and lower cost by distributing work amongst many lower cost memory controllers. This new architecture also provides a dynamically cooperative environment which can be quickly and easily expanded to include any number of memory controllers.

Message Primitives

To describe this architecture, a notation based upon directed acyclic graphs (DAG) is used. (This notation is described in the reference by Garth Gibson, William Courtright II, Mark Holland, Jim Zelenka, "RAID frame: *Rapid prototyping for disk arrays*", Oct. 18, 1995, CMU-CS-95-200, hereby incorporated by reference.) The DAGs provide an easy way to describe parallelism in operations. For that reason, DAGs are used to help present how multiple controllers can be used in building a high performance, fault tolerant RAID system. The DAGs are made up of a series of message primitives linked together by ordered dependencies. The invention includes an extension of the methodology to allow for the design of an n-way controller based, load balancing, cache coherent, and fault tolerant type of architecture. The extension comes in the form of a message passing capability and the removal of the restriction that the message primitives are tied to a particular memory controller.

Software Block Level Architecture

The I/O subsystem architecture is designed around the need to process operations, generate tokens, move messages between controllers, and process tokens. To accomplish this task, four basic execution units are used in the system. As illustrated in FIG. 1, there are:

DAG Builder or Token Generation Unit 102—This is used to convert an operation into a directed acyclic graph for execution.

Token Dispatch Unit 103—This is responsible for taking a list of tokens which need to be executed and distributing them to the appropriate processing resource.

Token Execution Unit 104—This is responsible for taking tokens from a token ready queue 107, executing them, and sending out the appropriate completion status.

Inter-processor Message Control Unit 105—This is responsible for handling all inter-processor communications, whether it is to send tokens between controllers, copying data between controller, or simply handling general communications between controllers.

The various execution units communicate to each other through various queues to allow them to operate asynchronously and independently. For example, the DAG Builder 102 receives I/O operations from an I/O operation unit 101, and configuration information from a configuration database 109. Then the DAG generation unit 102 communicates with Token Dispatch Unit 103 via Token Available Queue 106; and Token Dispatch Unit 103 communicates with Token Unit 104 via Token Ready Queue 107. The goal is to allow whichever unit has work to do, to be able to complete the work without relying on other execution units to complete a task. FIG. 1 shows an exemplary embodiment illustrating how the various software and hardware elements cooperate with each other to build a controller I/O execution machine. There are other pieces of additional support code which are not shown in this diagram but may readily be appreciated by those workers having ordinary skill in the art. Each of these blocks could run under its own context in the event a multi-threaded operating system was used to provide the underlying platform support.

Figure 2:
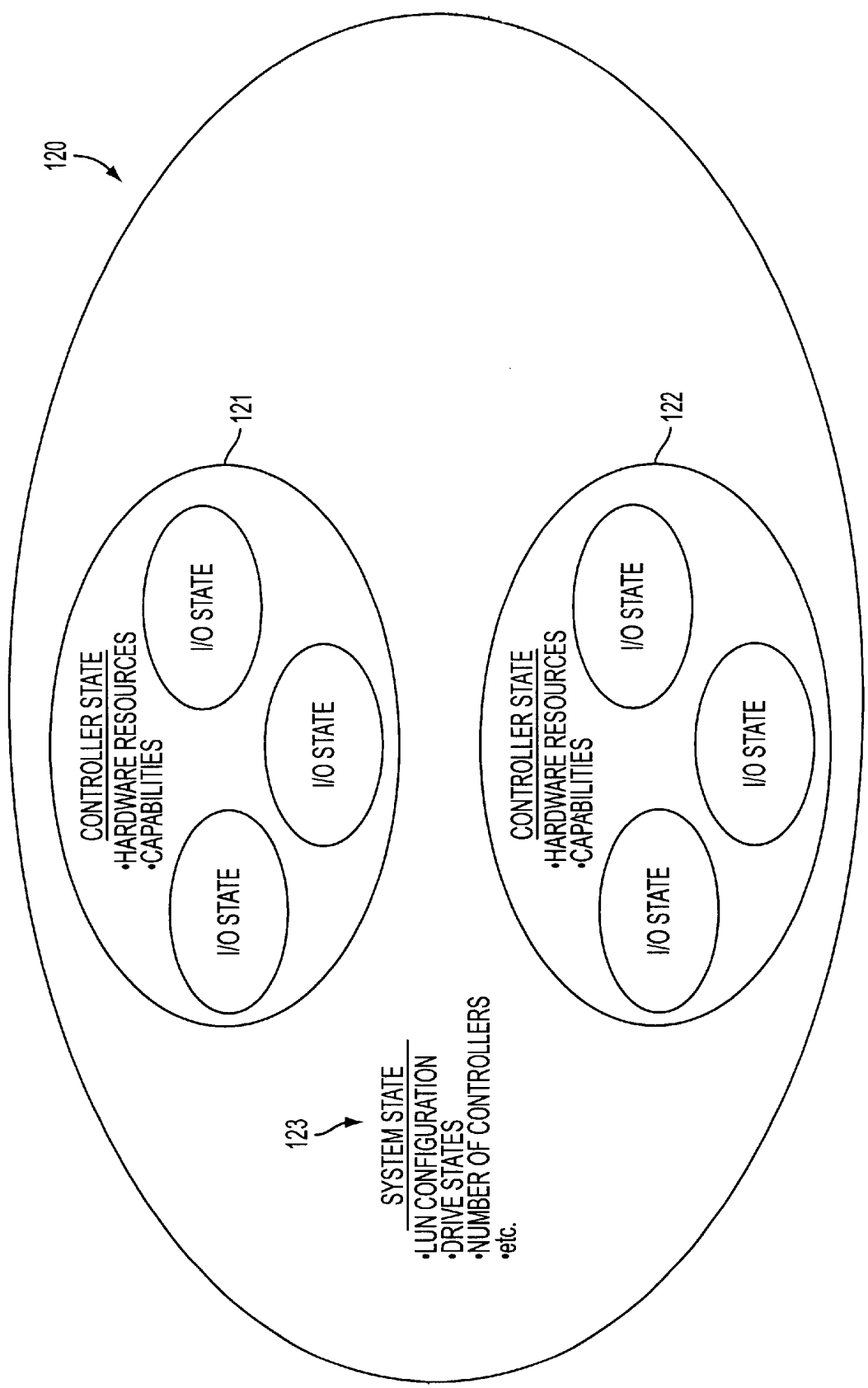
FIG. 2 shows a diagrammatic illustration of an embodiment of a System State Diagram.

To keep track of the various operations going on in the system at any one time state information is kept stored at numerous different levels. An exemplary state diagram is illustrated in FIG. 2. Relevant state information 120 includes controller states 121, 122 (including state of hardware resources and capabilities), and system state 123 (including for example, LUN configuration, drive status, number of controllers, etc.). The state information can be looked at in two ways, (i) its level of system wide relevance, (ii) and its level of transitory nature. As each system component becomes smaller, the amount of state information they need to maintain becomes less relevant to the overall system and more transient in nature. There is the overall system configuration, which includes how the system drives logical unit numbers (LUNs) are defined, the state of individual drives, etc. At a controller level, each controller is responsible for knowing its available resources and their current state. Local resources to a controller includes the number of number of ports available to access backing storage devices, how much data cache is available, the number of host ports, etc. Individual I/O operations have a state which is used to track the operation through completion. At the finest level of granularity, each token keeps track of its current state.

This type of software architecture needs only a reasonably efficient hardware structure and method for passing messages around between the various processing units. However, for this architecture to operate efficiently, the time spent obtaining and passing messages around is desirably a small percentage of the amount of time required to process the message and process its payload. For this reason certain hardware architectures are better suited to this software architecture than others.

Token Execution Unit 104

Figure 3:
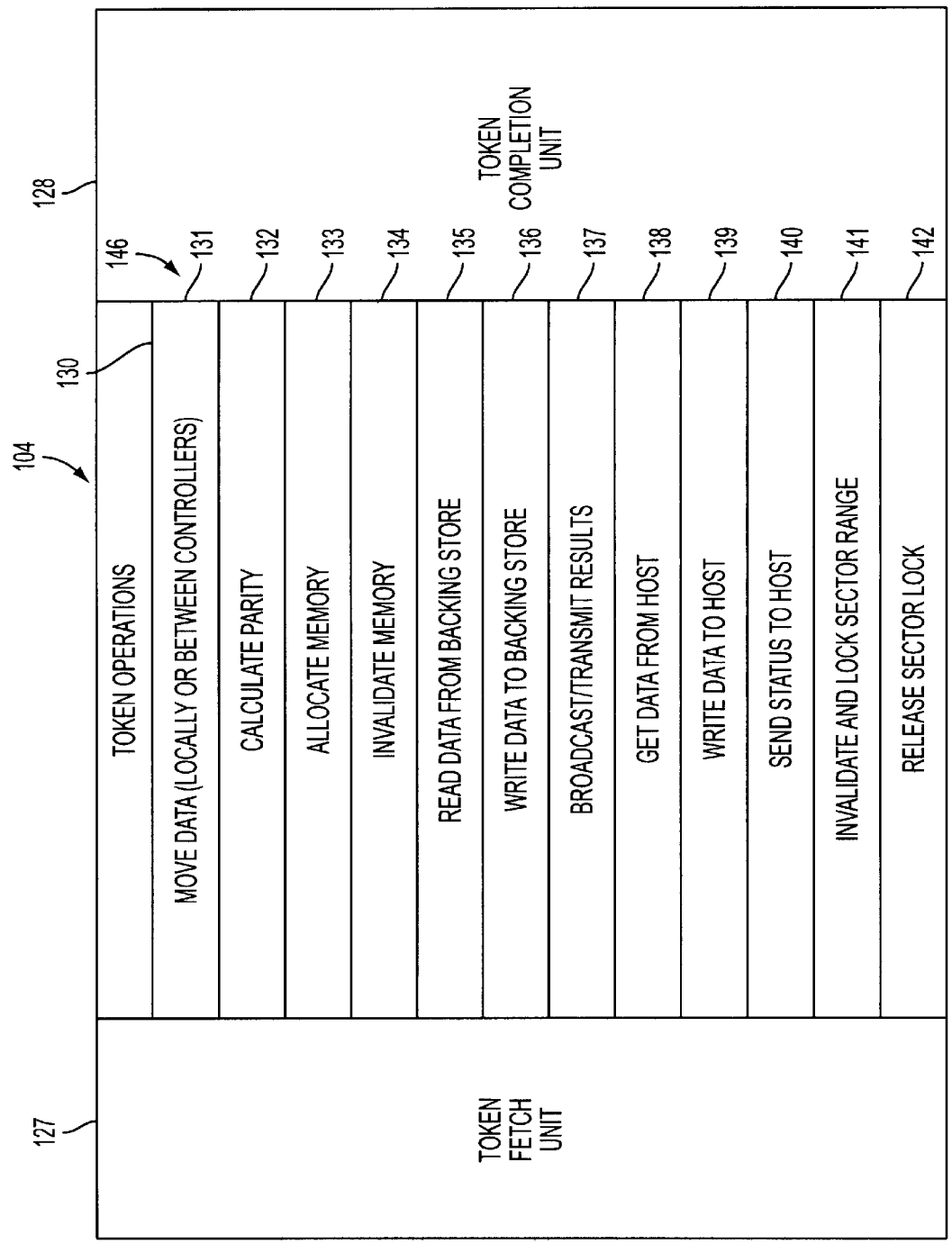
FIG. 3 shows a diagrammatic illustration of an embodiment of a Token Execution Unit.

Each processor card includes a token execution unit (execution engine) 104 that contains the intelligence to know which tokens to obtain and execute, the tools or methods to execute the tokens, and to broadcast or transmit information operations. As illustrated in FIG. 3, the Token Execution Unit 104 pulls the tokens from the token ready queue 107 as they are set to a "ready" state. The tokens reach a "ready" state when all the prior dependencies are fulfilled. The token execution unit 104 is comparable to a pipelined processor in which multiple tokens can be in various stages of execution and all in parallel. The execution unit 104 includes token fetch unit 127 which can also implement filtering for which type of tokens it wants to accept. By allowing the token fetch unit to perform filtering, the system allows for greater flexibility, for example a host processor board might not have any local cache and thus could ignore all cache invalidate broadcast messages.

The currently defined primitives 130 for the tokens include:

Move data (locally or between controllers) 131
Calculate Parity 132
Allocate memory 133
Invalidate memory 134
Read data from backing store 135
Write data to backing store 136
Broadcast/transmit results 137
Get data from host 138
Write data to host 139
Send status to host 140
Invalidate and lock sector range 141
Release sector lock 142

All I/O operations that the controllers are capable of performing can be broken up into these primitives in one form or another. Each primitive 130 can have a micro state machine to allow it to perform operations in pieces. This allows a disk read to be broken up into pieces which match the available memory in the system. In addition to the state kept in the primitives, there is an I/O state which keeps track of how the host or internal operation is progressing through the system at a global level. Examples of host activity which are handled by the execution unit 104 would be reads or writes. Internally generated operations would include rebuild parity, check parity, and initialize parity. The primitives can represent either software or hardware operation depending upon the available hardware. For example, on one controller the parity generation operation may be carried out by a dedicated piece of hardware, while on another it is a software or firmware procedure executing on a general purpose or specialized processor, connected to memory which defines a data structure to store the procedural instructions, data, and the like.

The token fetch unit 127 is responsible for pulling tokens which are "ready" from the token ready queue 107. A token is ready for execution when all of its prior conditions are met. All prior conditions are met when, all tokens connected to the input side of a token have completed execution. The token completion unit 128 is responsible for passing completion status to all dependent tokens, whether they reside locally or on a remote processing unit.

Directed Acyclic Graph Generation Unit 102

In addition, to the Token Execution Unit 104, there is a DAG generation unit 102 facility. The DAG generation facility uses the configuration information available on a system wide and local basis and stored or otherwise available from a configuration database 109 to create the list of tokens to execute and their dependencies upon each other and concurrent system activities. This list of tokens 146 is then placed upon an execution pending queue. All controllers need to have access to this queue or queues to obtain tokens to execute. The broadcast queue is a subset of the execution pending queue, in which, whenever all the prior conditions are met for the broadcast to be executed, the token is sent to all other controllers. It is then up to the other controllers to execute or discard the broadcast message. Broadcast messages come in two forms, ones which require immediate execution and those which need only to be executed before further host I/O or a failover/failback is performed.

Directed Acyclic Graph Examples

Figure 4:
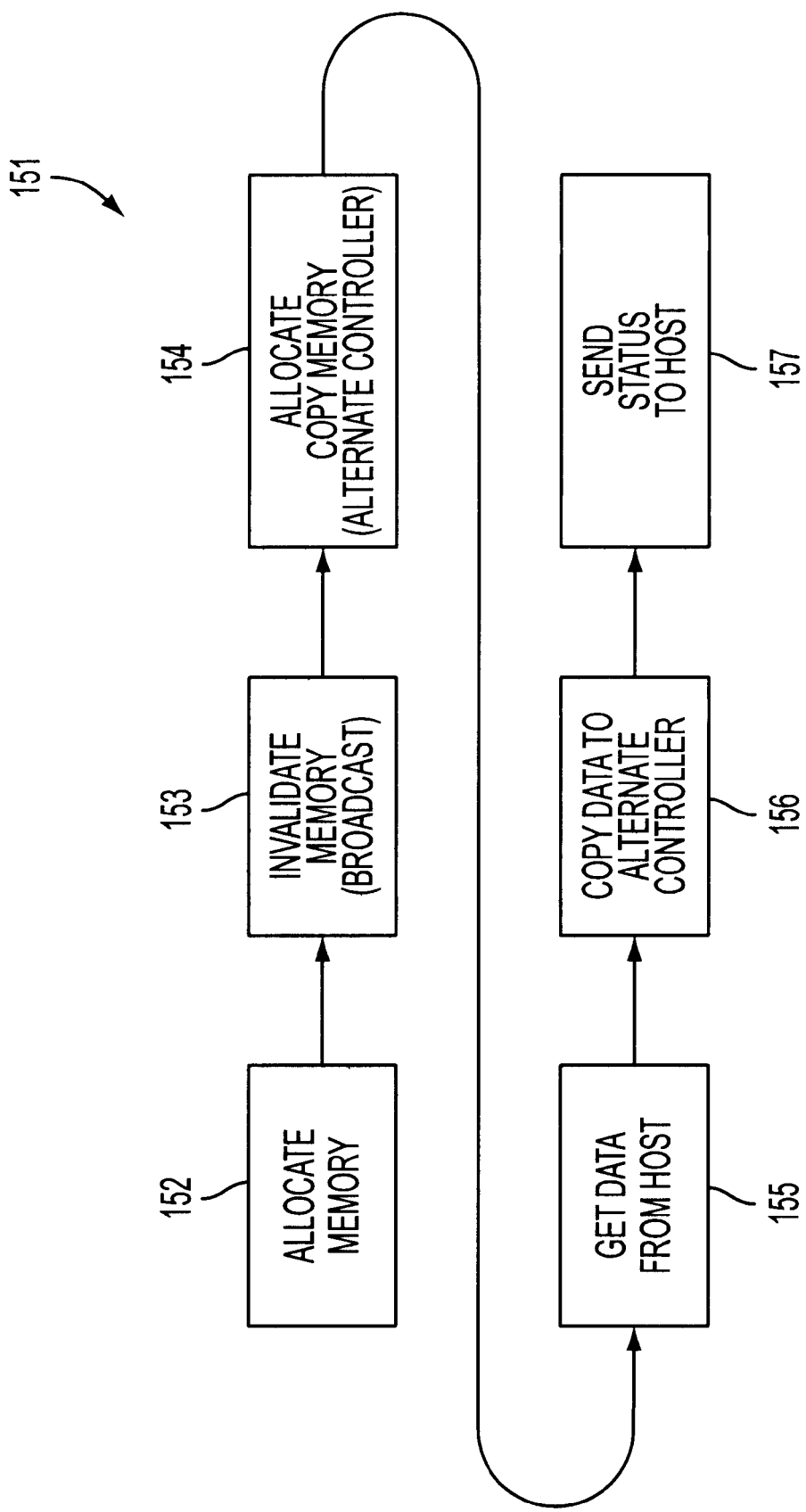
FIG. 4 shows a diagrammatic illustration of an embodiment of an exemplary Write Operation (write through LUN)

FIG. 4 illustrates an ambodiment of a write thru operaton wherein deat is written to dick before status is given to host.

In FIG. 4, there is shown an exemplary directed acyclic graph 151. The graph 151 shows an exemplary sequence of operations or procedures including: allocate memory 152, invalidate memory (broadcast) 153, allocate copy memory (alternate controller) 154, get data from host 155, copy data to alternate controller 156, and send status to host 157. The graph 151 also illustrates the manner in which the broadcast message needs only to be executed by the alternate controller 154 before the copy data operation takes place. All other controllers can defer execution until an I/O operation arrives for that area (logical block) in the system drive. The initial application of the broadcast message is to provide an easy technique for keeping multiple caches coherent in a multiple controller system. Due to limitations in host communications, the initial allocate memory 152, get data from host 155, and send status to host 157, must be executed on the controller which received the write command. This is due to a multiple path limitation for accepting and sending data between a host bus adapter (HBA) and a storage device rather than being a limitation of the software and/or architecture. Because certain tokens are related to other, as illustrated in FIG. 4, the allocate on the alternate controller 154, and the copy data to alternate controller 156, need to both execute on the same controller, a method is needed to be able to relate tokens. This is done through the use of a unique token execution thread identifier. Through this identifier, the controller which allocates the memory can be told which memory to place the copy data into.

Figure 5:
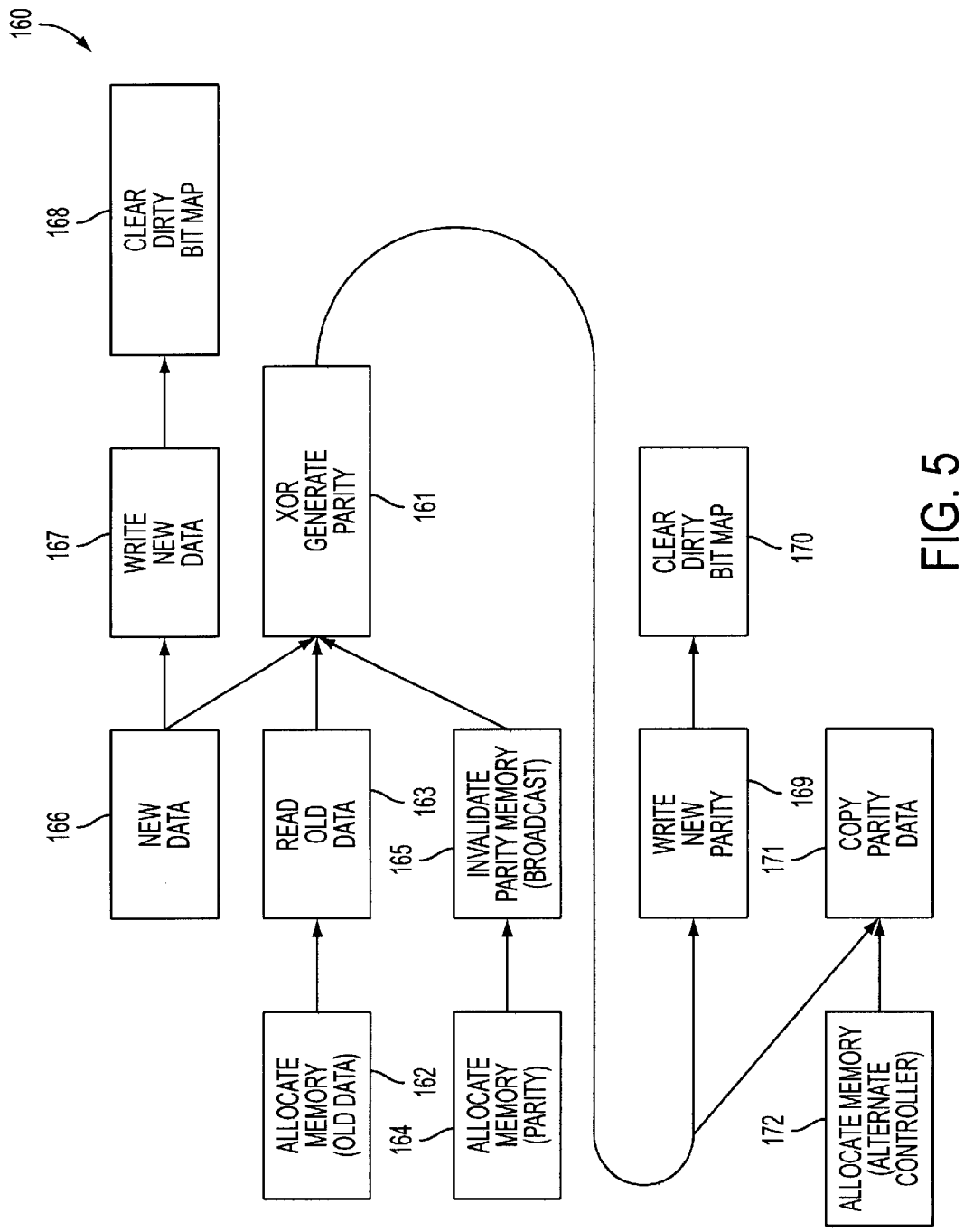
FIG. 5 shows a diagrammatic illustration of an embodiment of an exemplary Write Back Operation.

FIG. 5 shows a more complicated operation (Write Back Operation) 160, in which data is stored in cache, status is given to host and data is written to disk, to demonstrate a larger degree of parallelism. In this example, depending on the design of the XOR engine 161, the old data allocate 162, and data read 163, the parity allocate 164 and invalidate 165, could all be done on different controllers. Generally, this would only work if the XOR engine 161 did not require the data to come from a local memory pool.

Token Dispatch Unit 103

Figure 6:
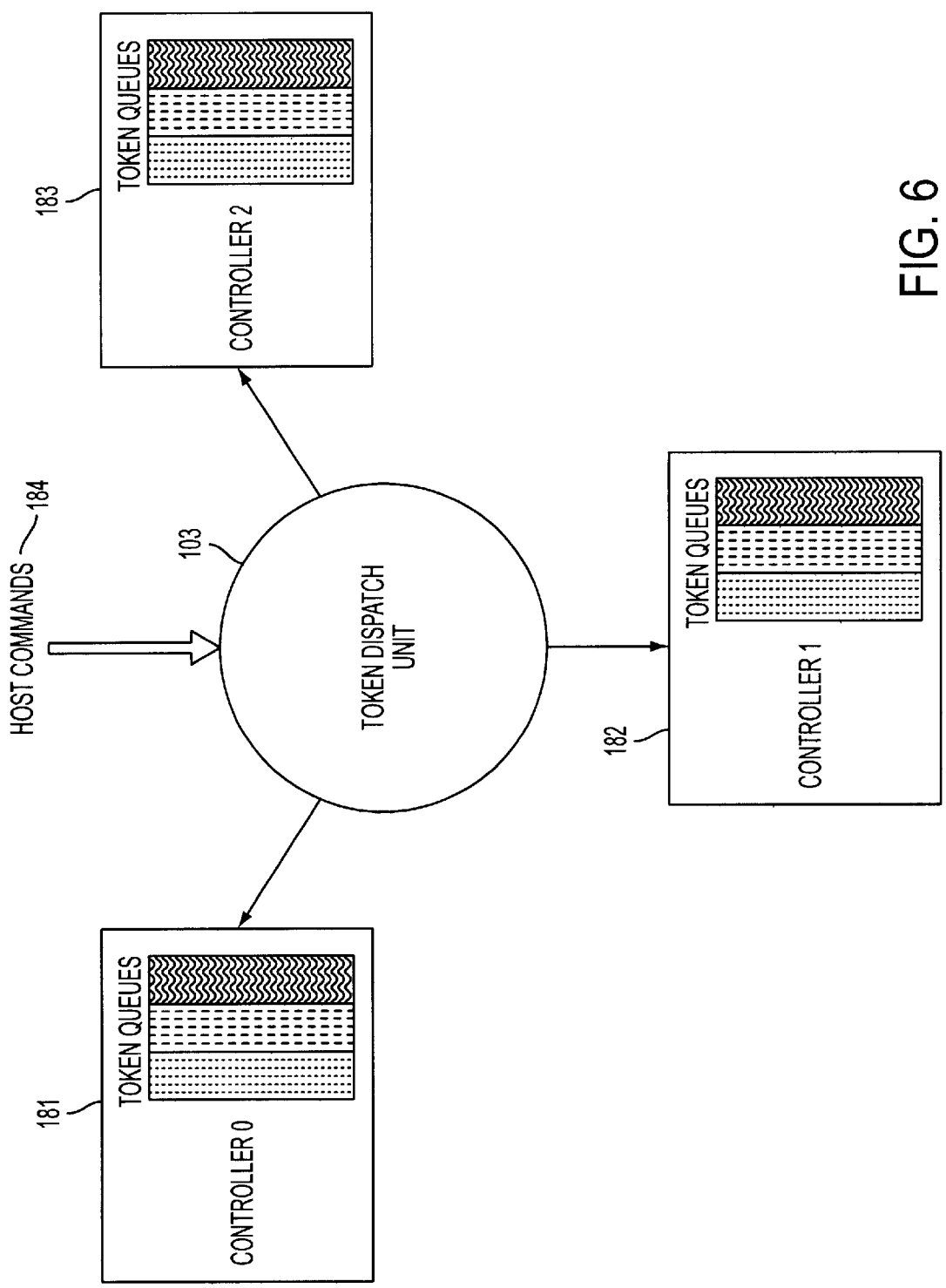
FIG. 6 shows a diagrammatic illustration of an embodiment of a Token Dispatch operation.

Structure and operation of the Token Dispatch Unit 103 is now described relative to the diagrammatic illustrations of FIG. 1 and FIG. 6. Certain tokens can only be executed by a specific processor, others can be executed by whichever processor has spare bandwidth, and some must be executed by all processors. The token classes include:

Processor Dependent Token—This type of token is tied to a particular processor, either due to an I/O operation constraint, or due to a prior token.

Processor Independent Single Token—This type of token can be executed by any available processor which has the appropriate resources.

Processor Independent All Token—This type of token will be executed by all the processors which make up the system, though there is no requirement that all need to take action on the token.

Based upon the token class, the token dispatch unit 103 can make decisions as to which processor a token can be sent to.

Each controller has a Token Dispatch Unit which has is used to distribute the workload across the various processing resources which are available in the system. This token distribution can be done through either a push model or procedure or a pull model or procedure. In the push model, each dispatch unit has knowledge of what the other controllers are currently working on, i.e. how many outstanding tokens the processor is working on, and from that information can determine which processor can be given more work.

In the pull model, each controller only knows what it is working on, and when it reaches a threshold it will request work from the other controllers in the system. In FIG. 6, an exemplary single Token Dispatch Unit 103 is shown which receives host commands from a host processor 184 and, which can pass tokens off to any of the available controllers 181, 182, 183 in the system. The diagram is shown this way to indicate that the token dispatch unit is not tied to any particular controller. In other words, the behavior of a controller does not change if it is accessing tokens from a local Token Dispatch Unit (such as within the controller itself) or from a remote dispatch unit.

Controller-to-controller Messages

For communications between the controllers the message packets can be broken up into three types or groupings. There are messages for which: (i) a response is required, (ii) the response is optional, and (iii) other in which the response is ignored. These messages are used to transmit tokens between controllers, in addition to providing a generic structure and procedure to allow controllers to communicate.

Exemplary Embodiment of the Controller Hardware Architecture

Figure 7:
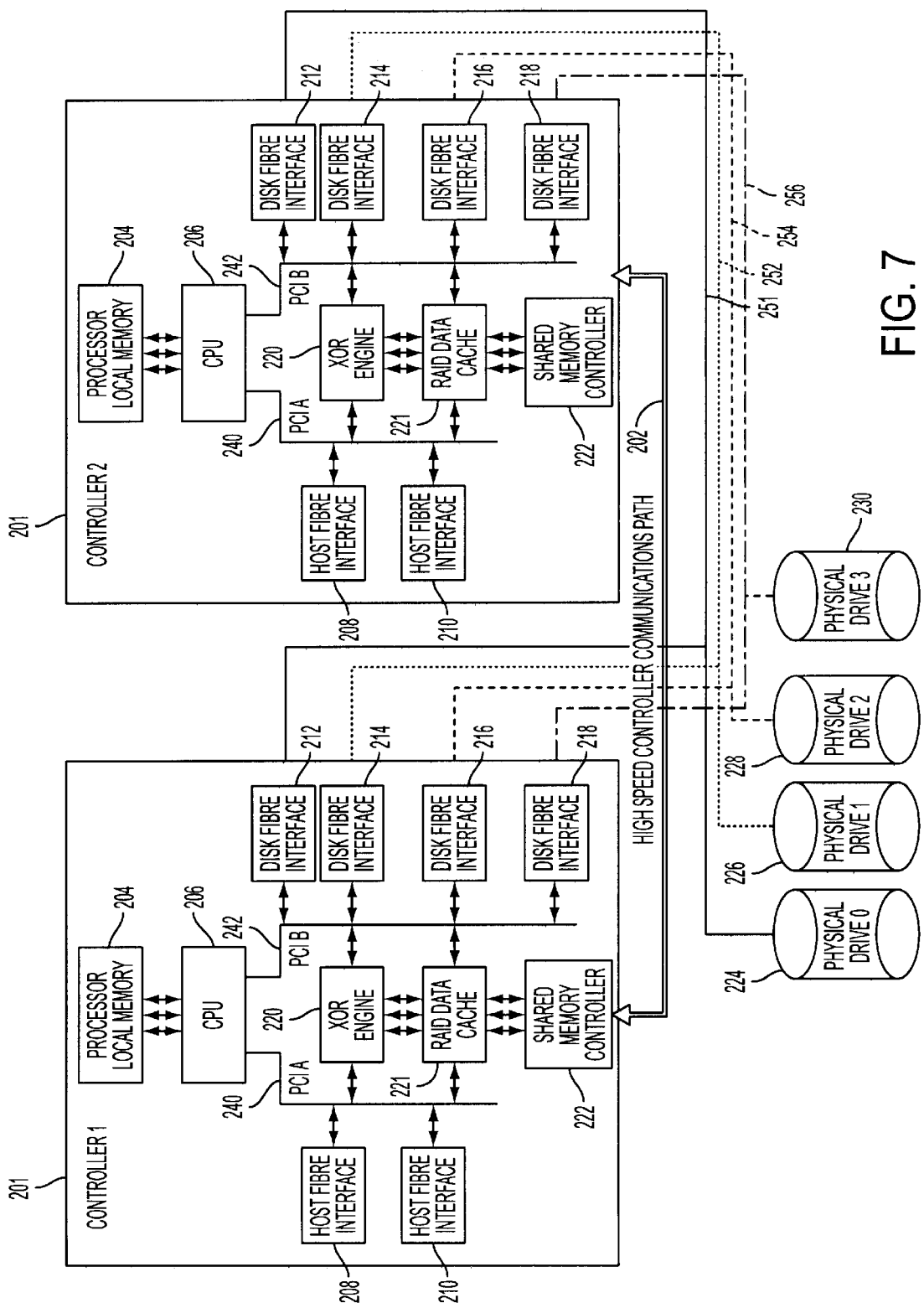
FIG. 7 shows a diagrammatic illustration of an embodiment of a Controller and Controller operation.

FIG. 7 shows an exemplary embodiment of an abstract hardware architecture for a RAID Controller 201 which represents one possible expansion to a Fibre/Fibre controller which provides hardware support for the message passing architecture. To allow for n-way controllers, the high speed controller communications path 202 needs to be able to provide a single shared memory image to as many controllers as possible. The communication path 202 is distinct from and not to be confused with a system bus connecting the memory controllers to a host computer system. The communication path comprises a high speed communication path extending directly between a first and second memory controller, and can comprise one or more of a Fibre Channel, a Small Computer System Interface, or a Mercury Interconnect.

In one exemplary architecture (DAC960SX) the disk channel connection scheme is also used to provide the controller-to-controller communications path. This works reasonably well when the processor does not need to be interrupted to handle each transaction. It may become somewhat limited as the amount of information or data grows and the size of the packets sent between controllers shrinks in size. Also, it should be noted that the disc channels are different from disc channels used in conventional RAID systems which connect directly from a controller to a disc drive, and in which any connection from one controller to another is incidental and generally undesirable.

Controller 201 includes a local memory store 204 for storing local data/program code for the central processing unit (CPU) 206 which implements the code execution engine and interfaces to memory store 204 and to two busses (for example PCI busses) or other data paths 240, 242 between the various elements in the controller card. Host-Fiber Channel interface blocks 208, 210 (typically implemented with single chips), provide hardware support to connect to a fibre Channel communications channel. Disk interface blocks 212, 214, 216, 218 (typically implemented with single chips), provide an interface and connection between disk drives 224, 226, 228, and 230 respectively over communication channels or links 251, 252, 254, and 256 respectively. These disk interface blocks may also typically be implemented with single chips and could support SCSI or Fibre Channel connection schemes.

Controller 201 also includes an exclusive OR (XOR) engine 220, typically a hardware implementation used to generate parity used in the RAID (e.g. RAID level 5) data striping procedure. A single "XOR" engine 220 supports both busses 240, 242 as illustrated in FIG. 7. RAID data cache 221 coupled to busses 240, 242 provides a high-speed storage area for data which is written by the host and needs to be stored on disk. Data cache 221 also provides a staging area for data which has been read from disk and needs to be transferred to the host.

Shared memory controller 222, also coupled to the other controller 201 elements via busses 240, 242, is the structure (usually implemented in hardware) through which the High-speed Controller communications path 202 allows one controller to access data in the other controller's data cache 221. Note that High-speed communications path 202 couples the RAID data cache 221 in each of the controllers 201 through their respective shared memory controllers 222. Shared memory controller 222 may also optionally be used to keep areas of the RAID data caches coherent, that is as the data changes in one cache, the changes are reflected in the other data cache. Shared memory controller 222 and RAID data cache 221 provide hardware support for passing the message primitives between controllers. Of course although two controllers are illustrated in the embodiment of FIG. 7, it is understood that more controllers may be configured in analogous manner and the communications path 202 would connect each of the controllers to the other controllers in like manner.

Storage devices 224, 226, 228, 230 have been described relative to the disk fibre interface hardware, but it is further noted that although these storage devices may typically be disk drives such as the type having rotatable magnetic disks, any other type of non-volatile storage device or system may be used, including but not limited to magneto-optical disks, optical disks, writable CD ROM devices, tape, electronic storage media, and so forth.

With both the SCSI and the Fibre controller interconnect schemes, there is a certain amount of software support required to set up transfers between controllers. In addition, there may be a significant latency between the time when a data transfer requests is made until the time when it actually makes it to the other controller. Thus, with more frequent transfers, the amount of time spent in message overhead becomes a more significant limiting factor to overall system performance. Devices have become available that provide this type of functionality in hardware and operate without processor intervention, thereby providing a lower latency interconnect. One such hardware scheme is the Scaleable Computer Interface (SCI) interconnect, which is described in the reference by R. Clark and K. Alnes, "An SCI Interconnect Chipset and Adapter", Symposium Record, Hot Interconnects IV, pp 22–235, August 1996, and hereby incorporated by reference. A second alternative is the Mercury Interconnect, which is described in the reference by Wolf-Dietrich Weber, Stephen Gold, et all, "The Mercury Interconnect Architecture: A Cost-effective Infrastructure for High-performance Servers", The 24th, Annual International Symposium on Computer Architecture, pp 98–107, and also hereby incorporated by reference. Both of these interconnect schemes are designed to provide the support for shared memory between processor units in an symmetric multiprocessor system; however, the inventors are not aware of any attempt to apply this type of technology in connection with, or applied to, RAID (Redundant Array of Independent Disks) system.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. A memory system for controlling a data storage system, the memory system comprising a token generation unit for parsing an instruction from a host computer into a plurality of component procedures, each of the plurality of component procedures represented by a token, and a plurality of storage controllers forming nodes within said memory system each including a processor and an internal cache memory coupled to said processor, each of said nodes coupled together by a communications path between any two or more of said plurality of storage controllers, the communications path selected from the group consisting of a Fibre Channel, a Small Computer System Interface, a Scaleable Computer Interface (SCI) Interconnect, and a Mercury Interconnect, the plurality of storage controllers adapted to dynamically distribute tokens to be executed amongst the plurality of storage controllers via the communications path.

2. A memory system according to claim 1, wherein each of the plurality of storage controllers comprises a separate internal cache memory controller coupled with said internal cache memory and through which the communications path allows each of the plurality of storage controllers to access data stored in another one of the plurality of controller's internal cache memory and to exchange messages with other ones of the plurality of storage controllers, and wherein the communications path is coupled to the plurality of storage controllers through the internal cache memory controller.

3. A memory system according to claim 2, wherein the separate internal cache memory controller further includes means for dynamically distributing tokens amongst the plurality of storage controllers, and said dynamic distribution of tokens includes permitting any one of said plurality of storage controllers that receives a token to accept or decline to accept responsibility for performing the act identified by said token.

4. A memory system according to claim 3 wherein the means for dynamically distributing tokens comprises a dispatch unit for receiving at least one token which is ready to be executed from the token generation unit and storing the token in a token ready queue.

5. A memory system according to claim 3, wherein the means for dynamically distributing tokens comprises an execution unit for determining if the storage
controller is qualified to execute a token, instructing the storage controller to execute the token, and transmitting a completion signal to other storage controllers.

6. A memory system according to claim 3, wherein the means for dynamically distributing tokens comprises an internode message control unit for transmitting tokens, data, and completion signals between storage controllers.

7. A memory system according to claim 3, wherein the computer program comprises:
   (a) a dispatch unit for receiving at least one token which is ready to be executed from the token generation unit and storing the token in a token ready queue;
   (b) an execution unit for taking a token from the token ready queue which the storage controller is qualified to execute, instructing the associated storage controller to execute the token, and transmitting a completion signal to other storage controllers; and
   (c) an internode message control unit for transmitting tokens, data, and completion signals between storage controllers.

8. A memory system according to claim 1 wherein the data storage system comprises a plurality of disk drives in a RAID configuration.

9. A memory system according claim 8, to wherein the storage controllers are coupled to the disk drives by disk channels, and wherein the disk channels serve as the communications path.

10. A memory system according to claim 1 wherein the storage controllers transfer data between the data storage system and the host computer in response to the instruction therefrom, and wherein each of the tokens represents a component procedure of the instruction.

11. A memory system according to claim 1, wherein said communications path is separate from a systems bus coupling said plurality of storage controllers to said host computer, and separate from a storage channel bus coupling said plurality of storage controllers to data storage devices with in said data storage system.

12. A memory system for controlling a data storage system, the memory system comprising a token generation unit for parsing an instruction from a host computer into a plurality of component procedures, each of the plurality of component procedures represented by a token, and a plurality of memory controllers coupled by a communications path, the memory controllers adapted to dynamically distribute tokens to be executed amongst the memory controllers via the communications path, the communications path selected from the group consisting of a Fibre Channel, a Small Computer System Interface, a Scaleable Computer Interface (SCI) Interconnect, and a Mercury Interconnect.

13. A memory system for controlling a data storage system, the memory system comprising:
   (a) a token generation unit for parsing an instruction from a host computer into a plurality of component procedures, each of the plurality of component procedures represented by a token;
   (b) a plurality of storage controllers each having a processor and a memory;
   (c) a communications path between any two or more of said plurality of storage controller nodes interconnecting the storage controller nodes, the communications path selected from the group consisting of a Fibre Channel, a Small Computer System Interface, a Scaleable Computer Interface (SCI) Interconnect, and a Mercury Interconnect; and
   (d) means for directing the storage controller nodes to dynamically distribute the tokens amongst the storage controller nodes via the communications path.

14. A memory system according to claim 13, wherein the means for directing the storage controller nodes to dynamically distribute the tokens comprises a computer program, and said dynamic distribution of tokens includes permitting any one of said plurality of storage controllers that receives a token to accept or decline to accept responsibility for performing the act identified by said token.

15. A memory system according to claim 14, wherein the computer program includes a computer program mechanism comprising:
   a program module that directs the memory system to transfer data between the data storage system and the host computer in response to instructions therefrom, the program module including program code for:
   (a) coupling the plurality of storage controller nodes for communication via the communications path;
   (b) parsing the instruction to identify at least one instruction component procedure;
   (c) broadcasting a token representing each instruction component procedure to the storage controller nodes; and (d) storing tokens in a token ready queue in each of the storage controller nodes.

16. A memory system according to claim 14, wherein each of the storage controller nodes comprise a computer readable medium with the computer program stored therein.

17. A networked computer system comprising:
(a) a server computer with a plurality of client computers coupled thereto; and
(b) a memory system connected to the server computer, the memory system capable of controlling a data storage system and comprising a token generation unit for parsing an instruction from a host computer into a plurality of component procedures, each of the plurality of component procedures represented by a token, and a plurality of storage controllers coupled by a communications path between any two or more of said storage controllers, the communications path selected from the group consisting of a Fibre Channel, a Small Computer System Interface, a Scaleable Computer Interface (SCI) Interconnect, and a Mercury Interconnect, the storage controllers adapted to dynamically distribute tokens to be executed amongst the storage controllers via the communications path.

18. A networked computer system according to claim 17 wherein each of the storage controllers comprise a computer readable medium with a computer program for dynamically distributing tokens amongst the storage controllers stored therein, and said dynamic distribution of tokens includes permitting any one of said plurality of storage controllers that receives a token to accept or decline to accept responsibility for performing the act identified by said token.

19. A networked computer system according to claim 18 wherein the computer program comprises:
(a) a dispatch unit for receiving at least one token which is ready to be executed from the token generation unit and storing the token in a token ready queue;
(b) an execution unit for taking a token from the token ready queue which the storage controller is qualified to perform, instructing the storage controller to perform the token, and transmitting a completion signal to the other storage controllers; and
(c) an internode message control unit for transmitting tokens, data, and completion signals between storage controllers.

20. A networked computer system according to claim 17 wherein the data storage system comprises a plurality of disk drives in a RAID configuration.

21. A networked computer system according to claim 20 wherein the storage controllers are coupled to the disk drives by disk channels, and wherein the disk channels serve as the communications path.

22. A networked computer system comprising:
(a) a server computer with a plurality of client computers coupled thereto; and
(b) a memory system connected to the server computer, the memory system capable of controlling a data storage system and comprising a token generation unit for parsing an instruction from a host computer into a plurality of component procedures, each of the plurality of component procedures represented by a token, and a plurality of memory controllers coupled by a communications path, the memory controllers adapted to dynamically distribute tokens to be executed amongst the memory controllers via the communications path, the communications path selected from the group consisting of a Fibre Channel, a Small Computer System Interface, a Scaleable Computer Interface (SCI) Interconnect, and a Mercury Interconnect.

23. A method for operating a memory system comprising a plurality of storage controllers, the memory system adapted to transfer data between a data storage system and one or more host computers in response to instructions therefrom, the method comprising:
(1) coupling the plurality of storage controllers with a communications path between any two or more of said storage controllers, the communications path selected from the group consisting of a Fibre Channel, a Small Computer System Interface, a Scaleable Computer Interface (SCI) Interconnect, and a Mercury Interconnect;
(2) parsing an instruction to identify at least one instruction component procedure;
(3) broadcasting a token representing each instruction component procedure to the storage controllers to provide dynamic distribution of the tokens; and
(4) storing tokens in a token ready queue in each of the storage controllers.

24. The method of claim 23 wherein the parsing an instruction comprises identifying a plurality of instruction component procedures.

25. The method of claim 23 further comprising dynamically distributing the tokens amongst the storage controllers via the communications path to balance a workload on each of the storage controllers.

26. The method of claim 25 wherein the dynamically distributing the tokens amongst the memory controllers comprises:
(i) determining if a storage controller is qualified to perform the component procedure represented by a token;
(ii) performing the component procedure if qualified; and
(iii) signaling the storage controllers via the communication path to delete the token from their token ready queue.

27. A computer program product for use in conjunction with a computer system, the computer program product comprising a computer readable storage medium and a computer program mechanism embedded therein, the computer program mechanism, comprising:
a program module that directs a memory system comprising a plurality of storage controllers, to function in a specified manner, to transfer data between a data storage system and at least one host computer in response to instructions therefrom, the program module including program code for:
(a) coupling the plurality of storage controllers with a communications path between any two or more of said plurality of storage controllers, the communications path selected from the group consisting of a Fibre Channel, a Small Computer System Interface, a Scaleable Computer Interface (SCI) Interconnect, and a Mercury Interconnect;
(b) parsing an instruction to identify at least one instruction component procedure;
(c) broadcasting a token representing each instruction component procedure to the storage controllers to provide dynamic distribution of the tokens; and
(d) storing tokens in a token ready queue in each of the storage controllers.

28. The computer program product of claim 27, wherein the program code for parsing an instruction comprises program code for identifying a plurality of instruction component procedures.

29. The computer program product of claim 27, wherein the program module further comprises program code for dynamically distributing the tokens amongst the plurality of storage controllers via the communications path to balance a workload on each of the storage controllers.

30. The computer program product of claim 29, wherein the program code for dynamically distributing the tokens amongst the storage controllers comprises program code for:
  (i) determining if a storage controller is qualified to perform the component procedure represented by a token;
  (ii) performing the component procedure if qualified; and
  (iii) signaling the storage controllers via the communication path to delete the token from their token ready queue.

31. A networked computer system comprising:
 a data storage control system coupleable to at least one external host computer controlling a data storage system comprising:
  a token processor for processing an instruction received from an external host computer into a plurality of instruction component procedures each represented by a token; and
  a plurality of storage controllers coupled by a communications path, the storage controllers adapted to dynamically distribute tokens to be executed amongst the storage controllers via the communications path, said dynamic distribution of tokens includes permitting any one of said plurality of storage controllers that receives a token to accept or decline to accept responsibility for performing the act identified by said token.

32. The system in claim 31, wherein the networked computer system further comprises the at least one external host.

33. The system in claim 32, wherein the at least one host computer is coupleable with a plurality of client computers.

34. The system in claim 31, wherein the at least one host computer is coupleable with a plurality of client computers.

35. The system in claim 31, wherein the networked computer system further comprises a plurality of external host computers, at least one of which is coupleable with a plurality of client computers.

36. The system in claim 31, wherein said token processor includes a token generation unit for generating a token from a received instruction, a token dispatch unit for taking a token and distributing it to a token processing resource, a token execution unit for executing a token and sending out a token execution completion status, and an internode message control unit for handling internode communications including for sending tokens between and among said plurality of storage controllers.

37. The system in claim 36, wherein said token execution unit is comprised within one of said plurality of storage controllers.

38. The system in claim 31, wherein said token processor is a distributed processor.

39. A data storage control system coupleable to at least one external host computer controlling a data storage system comprising:
 a token processor for processing an instruction received from an external host computer into a plurality of instruction component procedures each represented by a token; and
 a plurality of storage controllers coupled by a communications path, the communications path selected from the group consisting of a Fibre Channel, a Small Computer System Interface, a Scaleable Computer Interface (SCI) Interconnect, and a Mercury Interconnect, the storage controllers adapted to dynamically distribute tokens to be executed amongst the storage controllers via the communications path.

40. The system in claim 39, wherein said token processor includes a token generation unit for generating a token from a received instruction, a token dispatch unit for taking a token and distributing it to a token processing resource, a token execution unit for executing a token and sending out a token execution completion status, and an internode message control unit for handling internode communications including for sending tokens between and among said plurality of storage controllers.

41. A storage controller system comprising a first controller including:
  (i) a first communications interface for communicating with an external host computer including for receiving, an instruction from said external host computer, a second communications interface for communicating with a data storage subsystem, and a third communications interface different from said first and said second communications interface for communicating with an external second controller different from said first controller, said third communications interface is a communications interface between said first and said second controllers selected from the group consisting of a Fibre Channel, a Small Computer System Interface, a Scaleable Computer Interface (SCI) Interconnect, and a Mercury Interconnect;
  (ii) a data cache memory within said first controller;
  (iii) a data cache memory controller coupled with and controlling said data cache memory, said third communications interface providing a data and control message passing mechanism between said first controller and said external second controller, said data and control message passing mechanism including a mechanism for passing an instruction token; and
  (iv) a token processor for processing an instruction into a plurality of instruction component procedures each represented by a token.

42. The system in claim 41, wherein said token processor includes a token execution unit for executing said token and sending out a token execution completion status, and an internode message control unit for handling internode communications including for sending tokens between and among said plurality of storage controllers.

43. The system in claim 42, wherein said token processor further includes a token generation unit for generating a token from a received instruction, and a token dispatch unit for taking a token and distributing it to a token processing resource.

44. A system as in claim 41, further comprising said second controller.

45. A system as in claim 41, wherein said second controller including:
  (v) a fourth communications interface for communicating with said first controller;
  (vi) a second data cache memory within said second controller and separate from said first controller data cache memory;
  (vii) a second data cache memory controller coupled with and controlling said second data cache memory, said fourth communications interface providing a data and control message passing mechanism between said first controller and said second controller, said data and control message passing mechanism including a mechanism for passing an instruction token between said first and said second controllers; and (viii) a token processor for processing an instruction into a plurality of instruction component procedures each represented by a token.

46. A processing network comprising:

a token processor for processing an instruction received from a an external host computer into a plurality of instruction component procedures each represented by a token; and a plurality of controller nodes coupled by a communications path between any two or more storage controller nodes, the communications path selected from the group consisting of a Fibre Channel, a Small Computer System Interface, a Scaleable Computer Interface (SCI) Interconnect, and a Mercury Interconnect, the controller nodes adapted to dynamically distribute said tokens to be executed amongst the controller nodes via a broadcast message over the communications path to all of said controller nodes, said dynamic distribution of tokens including permitting any one of said plurality of storage controllers that receives a broadcast of a token to accept or decline to independently accept responsibility for performing the act identified by said token.

47. A distributed processing method comprising:

processing an instruction received from an external host computer into a plurality of instruction component procedures each represented by a token;

broadcasting the tokens over a communications path between a plurality of storage controller nodes to a plurality of storage controller nodes coupled by said communications path, the communications path selected from the group consisting of a Fibre Channel, a Small Computer System Interface, a Scaleable Computer Interface (SCI) Interconnect, and a Mercury Interconnect; and dynamically distributing said tokens to be executed amongst the controller nodes including permitting any one of said plurality of storage controllers that receives a broadcast of said token to accept or decline to independently accept responsibility for performing the act identified by said token.

* * * * *